Patented May 4, 1937

2,079,543

UNITED STATES PATENT OFFICE 2,079,543

CONTINUOUS PROCESS OF PRODUCING CARBON BISULPHIDE

Rudolph S. Bley, Elizabethton, Tenn., assignor to North American Rayon Corporation, New York, N. Y., a corporation of Delaware No Drawing. Application February 25, 1935, Serial No. 8,203

11 Claims. (Cl. 23—206)

The present invention relates to a continuous process of producing carbon bisulphide.

The primary object of this invention relates to the manufacture of carbon bisulphide by heating waste rayon of cellulosic origin, such as viscose, cuprammonium cellulose, cellulose esters, cellulose ethers, etc., with sulphur in the presence of a heat-retaining, refractory material.

Another object of my invention has to do with the production of carbon bisulphide by heating carbon or waste rayon under a superatmospheric pressure in the presence of sulphur and a heat-retaining refractory material such as aluminum oxide, magnesium oxide, etc.

Other objects of my invention will become apparent to those skilled in the art after a study of the following specification.

In U. S. Patents, Nos. 1,992,895 and 1,992,896, granted on January 18, 1935, I have disclosed a process of producing hydrogen sulphide by heating waste rayon under a superatmospheric pressure in the presence of sulphur. Further experimentation with waste rayon and sulphur unexpectedly revealed that large amounts of carbon bisulphide may be produced, instead of hydrogen sulphide, if the reaction is carried out at higher temperatures in the presence of heat-retaining, refractory materials, such as metal oxides, etc.

I am well aware that it has, heretofore, been proposed to form carbon bisulphide by heating sulphur and carbon, this reaction taking place in accordance with the following equations:

(1) $2(SO_2)+2C \rightleftarrows 2(CO_2)+S_2$ (2) $S_2+C \rightleftarrows CS_2$ (3) $CO_2+C \rightleftarrows 2(CO)$ (4) $S_2+2(CO_2) \rightleftarrows COS+CO+SO_2$ (5) $S_2+2(CO) \rightleftarrows 2(COS)$ (6) $CS_2+CO_2 \rightleftarrows 2(CO)+S_2 \rightleftarrows 2(COS)$ (7) $2(SO_2)+4C \rightleftarrows 4(CO)+S_2$ In practice, however, it has been found that only about 50% of the sulphur employed can be converted into carbon bisulphide, the remainder being free sulphur, carbon oxysulphide, carbon monoxide and carbon dioxide. According to my novel process of producing carbon bisulphide, the yield of carbon bisulphide is increased by causing sulphur or sulphur dioxide to react upon carbon or waste rayon of cellulosic origin at an elevated temperature in the presence of a heat-retaining, inert material. These inert materials must be infusible at the temperature of reaction and able to retain the heat applied to the reacting mixture of carbon and sulphur. For this purpose, refractory oxides, silicates, chromates, etc. have been employed with excellent results. Magnesium and aluminum oxides, are especially suitable for accelerating the reaction between sulphur and carbon, although I wish to emphasize that my invention is not limited to the use of these materials, since any refractory and heat-retaining substance can be employed. Although, magnesium and aluminum oxide may act somewhat as catalysts to promote the formation of carbon bisulphide, the larger yield of carbon bisulphide is not due to catalytic action but to the presence of heat-retaining materials. The reaction should take place within a range of about 700 to 1000° C. The amounts of carbon and sulphur, used in the reaction, are not critical, since it is only necessary to replenish the exhausted component. The amounts of heat-retaining materials may be varied within wide limits, although I have found that a mixture carbon-sulphur: heat-retaining materials=1.1 gives excellent results.

The reaction may be carried out in a conventional autoclave provided with inlets for sulphur and carbon and heat-controlling means. The carbon bisulphide vapors may be condensed by conventional means. The reaction may be carried out under a superatmospheric pressure within the range of 700 to 1000° C. in order to render the process more economical. Instead of carbon, I may also use waste rayon, such as viscose, cuprammonium cellulose, cellulose esters, cellulose ethers, etc., and sulphur-containing cellulose sludge, the latter settling at the bottom of spinning tanks, baths, etc. Due to the fact that this material contains finely divided sulphur and sulphur compounds, cellulose sludge acts as an accelerator for the formation of carbon bisulphide from sulphur and carbonaceous materials. The amounts of sulphur, carbon, waste rayon, cellulose sludge and heat-retaining materials must be individually determined by experiment, although it is to be noted that an excess of either one of these substances does not adversely affect the reaction itself. However, for reasons of economy excess material should be avoided. The reacting mass is slowly heated and the vapors, issuing therefrom, are condensed and tested. The temperature must be maintained within such a range that the formation of hydrogen sulphide is minimized.

I wish to point out that the compounds as well as the temperatures, set forth above, are merely illustrative, and may somewhat be varied without departing from the spirit and scope of my invention. No limitations should be imposed upon my invention except as indicated in the appended claims.

I claim:

1. In the process of producing carbon bisulphide, the step comprising causing a substance of the group consisting of sulphur and sulphur dioxide to react upon a waste rayon of cellulosic origin at a temperature of about 700 to 1000° C. in the present of a magnesium oxide.

2. In the process of producing carbon bisulphide, the step comprising causing a substance of the group consisting of sulphur and sulphur dioxide to react upon a waste rayon of cellulosic origin at a temperature of about 700 to 1000° C. in the presence of large amounts of an inert, heat-retaining metal oxide, said oxide being infusible at said temperatures.

3. In the process of producing carbon bisulphide, the step comprising causing a substance of the group consisting of sulphur and sulphur dioxide to react upon a waste rayon of cellulosic origin at a temperature of about 700 to 1000° C. in the presence of large amounts of an inert, heat-retaining metal oxide and a cellulose sludge, said substance being infusible at said temperatures.

4. In the process of producing carbon bisulphide, the step comprising causing a substance of the group consisting of sulphur and sulphur dioxide to react upon waste rayon of cellulosic origin at a temperature of about 700 to 1000° C. in the presence of large amounts of a magnesium oxide and a cellulose-sludge.

5. In the process of producing carbon bisulphide, the step comprising causing a substance of the group consisting of sulphur and sulphur dioxide to react upon a waste rayon of cellulosic origin at a temperature of about 700 to 1000° C. in the presence of a large amount of an inert, heat-retaining substance of the group consisting of metal oxides, metal silicates and metal chromates, said substance being infusible at said temperatures.

6. In the process of producing carbon bisulphide, the step comprising causing a substance of the group consisting of sulphur and sulphur dioxide to react upon a waste rayon of cellulosic origin at a temperature of about 700 to 1000° C. in the presence of a cellulose sludge and a large amount of an inert, heat-retaining substance of the group consisting of metal oxides, metal silicates and metal chromates, said substance being infusible at said temperatures.

7. In the process of producing carbon bisulphide, the step comprising causing a substance of the group consisting of sulphur and sulphur dioxide to react upon a waste rayon of cellulosic origin at a temperature of about 700 to 1000° C. in the presence of a large amount of an inert and heat-retaining metal silicate, said silicate being infusible at said temperatures.

8. In the process of producing carbon bisulphide, the step comprising causing a substance of the group consisting of sulphur and sulphur dioxide to react upon a waste rayon of cellulosic origin at a temperature of about 700 to 1000° C. in the presence of a cellulose sludge and a large amount of an inert, heat-retaining metal silicate, said silicate being infusible at said temperatures.

9. In the process of producing carbon bisulphide, the step comprising causing a substance of the group consisting of sulphur and sulphur dioxide to react upon a waste rayon of cellulosic origin at a temperature of about 700 to 1000° C. in the presence of a large amount of an inert and heat-retaining metal chromate, said chromate being infusible at said temperatures.

10. In the process of producing carbon bisulphide, the step comprising causing a substance of the group consisting of sulphur and sulphur dioxide to react upon a waste rayon of cellulose origin at a temperature of about 700 to 1000° C. in the presence of a cellulose sludge and a large amount of an inert, heat-retaining metal chromate, said chromate being infusible at said temperatures.

11. In the process of producing carbon bisulphide, the step comprising causing a substance of the group consisting of sulphur and sulphur dioxide to react upon a waste rayon of cellulosic origin at a temperature of about 700 to 1000° C. and under a superatmospheric pressure in the presence of a large amount of an inert, heat-retaining substance of the group consisting of metal oxides, metal silicates and metal chromates, said substance being infusible at said temperature.

RUDOLPH S. BLEY.